United States Patent [19]

Forman

[11] 4,010,412
[45] Mar. 1, 1977

[54] CONTROL OF ELECTRICAL POWER SUPPLIES

[75] Inventor: George Donald Forman, West Wickham, England

[73] Assignee: St. Paul's Engineering Company, London, England

[22] Filed: May 8, 1975

[21] Appl. No.: 575,712

Related U.S. Application Data

[63] Continuation-in-part of Ser. No. 459,598, April 10, 1974, abandoned, which is a continuation of Ser. No. 345,290, March 27, 1973, abandoned.

[30] Foreign Application Priority Data

Mar. 27, 1972 United Kingdom ............ 14168/72

[52] U.S. Cl. .................................. 323/18; 307/39; 307/41; 323/19; 323/25
[51] Int. Cl.² ....................................... G05D 23/01
[58] Field of Search .................. 307/38, 39, 40, 41; 317/139; 323/18, 19, 23, 24, 25; 328/75, 106

[56] References Cited

UNITED STATES PATENTS

| | | | |
|---|---|---|---|
| 3,426,259 | 2/1969 | Ziehm | 307/41 X |
| 3,586,869 | 6/1971 | Kompelien | 307/41 |
| 3,663,950 | 5/1972 | Bartlett | 323/24 |
| 3,677,335 | 7/1972 | Weatherston | 307/39 X |
| 3,714,453 | 1/1973 | Delisle et al. | 307/39 |
| 3,723,753 | 3/1973 | Davis | 307/41 |

*Primary Examiner*—A. D. Pellinen
*Attorney, Agent, or Firm*—Baldwin, Wight & Brown

[57] ABSTRACT

Apparatus for distributing power from a single alternating current supply to a plurality of loads having individual switches or thermostats comprises triacs placed in series with each of the loads, a generator to generate a continuous series of firing pulses timed substantially to coincide with the zero crossing points of the alternating current supply which pulses are utilized to fire the triacs and control logic operative to direct immediately suceeding trains of the firing pulses to switch on different triacs for successive integral numbers of half cycles of the supply in accordance with a continuous programmable sequence, the control logic being programmed in accordance with the condition of the individual switches or thermostats associated with the loads and advanced through its sequence by a clock generator preferably driven or synchronized by the supply frequency.

9 Claims, 9 Drawing Figures

CONTROL OF ELECTRICAL POWER SUPPLIES

CROSS REFERENCE TO RELATED APPLICATION

This application is a continuation-in-part of Ser. No. 459,598, filed Apr. 10, 1974, now abandoned, which is a continuation of Ser. No. 345,290, filed Mar. 27, 1973, now abandoned.

BACKGROUND OF THE INVENTION

This invention relates to apparatus for distributing power from a single a.c. source to a plurality of consuming units, more particularly electrical appliances, or energy consuming elements within a single appliance, which appliances or elements are operated so as to have an average consumption of electrical energy which is much lower than their maximum consumption.

In a conventional electrical installation in which a number of appliances are fed from a common supply, and in which all the appliances may be turned on at the same time, it is usually necessary for the supply wiring to be capable of sustaining, and the supply to be capable of supplying, the total maximum power demand of all the appliances operating simultaneously. Moreover, in large electrical installations the tariffs charged by electricity supply authorities are often dependent, sometimes very markedly so, upon the peak power demand of the installation. The desirability of reducing peak power demand whenever possible is thus manifest.

It is a feature of many types of electrical equipment, in particular much equipment incorporating electrical heating elements, that the maximum power demand is much greater than the normal average power demand. Such equipment is usually thermostatically controlled and under normal running conditions the "off" periods of the thermostat are long compared with the "on" periods. Nevertheless, the wiring of an installation containing several units of such equipment must provide for the possibility of all the thermostats being on simultaneously. Similar considerations apply to an appliance containing several independently controlled heating elements, such as an electric cooker.

It has been proposed to provide installations in which the maximum loading on the supply is controlled by arranging that an increasing number of portions of the load are disconnected by a "stabilizer" as their combined demand increases so as to restrict total consumption to a predetermined level, the order in which such portions are disconnected being according to a predetermined scheme of priorities. It has also been proposed that load portions of equal priority in such an arrangement should be separately connected to the stabilizer through a commutating arrangement so that their positions in the priority scale are periodically exchanged and in the long term, power is distributed to such equal priority loads according to the mean priority level of the connections between the commutating arrangement and the stabilizer.

A disadvantage of such systems of this nature that have been proposed is that the various load portions are wholly disconnected from the supply when load shedding takes place, and also the switching operations involved, although maintaining demand below a maximum level, will give rise to transient fluctuations in loading which not only may give rise to radio interference but also may cause undesirable fluctuations in the supply voltage, particularly if the loads being switched are large.

Power control systems for alternating current supplies are well known which make use of thyristors and other related semiconductor devices such as triacs. Such systems are of two main types. The first, phase control, type relies on varying the point in each, or each alternate, half cycle of the supply at which the control device is switched on. This type of control presents severe radio interference and power factor problems and is not favored for installations having a substantial power consumption. The alternative "burstfire" system, in which control is exercised by controlling the frequency and or length of periods or "bursts" for which the control device is switched on for an integral number of half cycles, overcomes the problems of the phase control method but does apply a fluctuating load to the supply. Moreover, if the duration of the burst is relatively short the frequency of this fluctuation is particularly objectionable.

BRIEF SUMMARY OF THE INVENTION

The object of the present invention is to provide a means for limiting the peak power demand of an installation or appliance comprising a number of individually controllable electrical loads or groups of loads which is not subject to the disadvantages discussed above.

According to the invention, apparatus for distributing power from a single alternating current source to a plurality of consuming units each having individual control means associated therewith, comprises gate triggered current maintained devices adapted to be placed in series with each of the consuming units, means repeatedly to trigger on said devices substantially at the zero crossing points of the alternating current supply, sequencing means operative to control said trigger means so as to trigger on different, or different combinations, of the devices for immediately successive non-overlapping bursts of integral numbers of half cycles of the supply in accordance with a continuously reprogrammable sequence, and programming means adapted to respond to the condition of individual control means associated with the consuming units and to reprogramme the sequencing means in accordance with changes in the condition of said individual control means.

The term gate triggered current maintained device is utilised for convenience as a collective term which should be understood to refer to thyristors including bidirectional devices such as triacs which are preferred for use in this application, as well as functionally equivalent but now obsolescent devices, such as thyratrons.

The term consuming units is utilized to refer to any electrical appliance or individually controllable element within such appliance, or to any combination of appliances or elements having an assessable power consumption when on.

The control means for the consuming units whose condition is to be responded to may be manually or automatically operated switches, thermostats, or any type of transducer capable of a change in condition which can be responded to by the programming means. In a system incorporating distribution apparatus according to the invention, each control means may either act so as to interrupt the circuit to its associated unit thus creating a condition which may be sensed and responded to the programming means, or preferably is not in series with its associated unit and acts directly upon the programming means.

Preferably the sequencing means is clocked through its repeating sequence by clock pulses generated by division of the frequency of the alternating current source.

BRIEF DESCRIPTION OF THE DRAWING FIGURES

The invention is described further below with reference to the accompanying drawings, wherein.

DETAILED DESCRIPTION OF THE INVENTION

Figure 1:
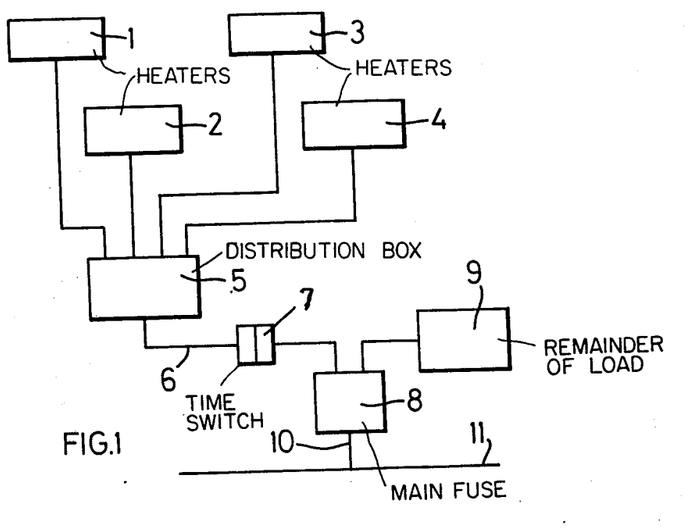
FIG. 1 is a simplified block diagram of parts of a domestic electrical installation incorporating a number of electrical storage heaters.
Figure 2:
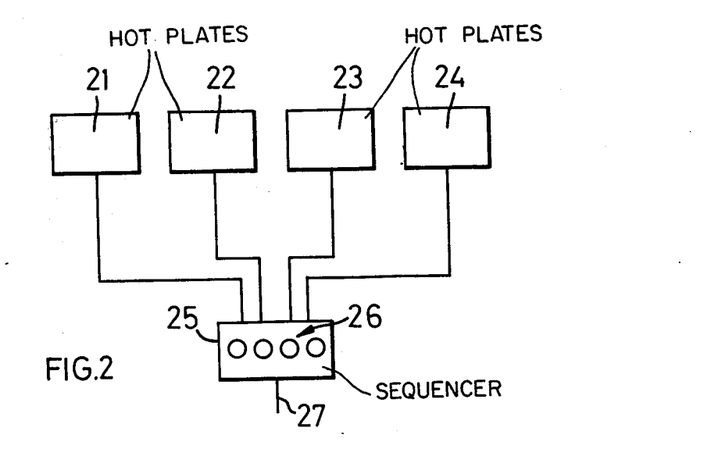
FIG. 2 is a simplified block diagram showing the hot plate system of a domestic electric cooker.
Figure 3:
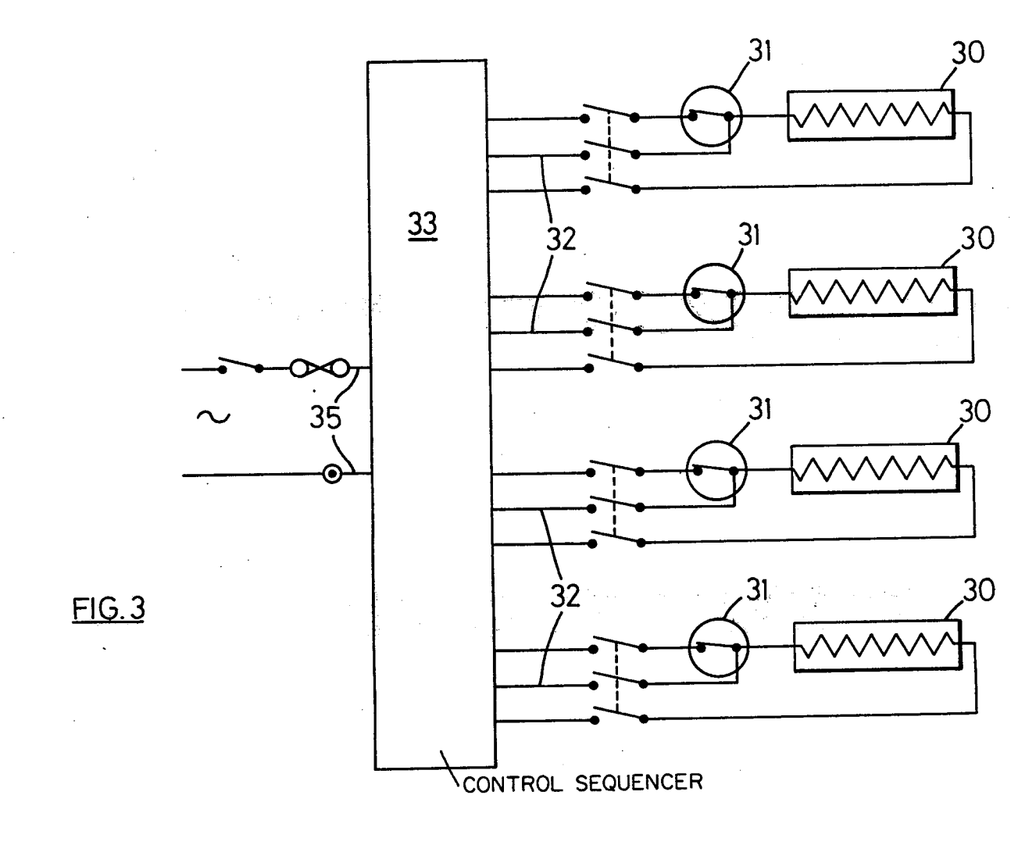
FIG. 3 is a simplified block diagram showing an industrial installation incorporating four similar heating loads.

FIGS. 1, 2 and 3 illustrate typical applications of the apparatus of the invention, which for the purposes of description in relation to these figures is considered to be a "black box" indicated by the reference numeral 5 (FIG. 1), 25 (FIG. 2) or 31 and 33 (FIG. 3) having certain functions. How these functions are achieved is described in more detail with reference to FIGS. 4A, 4B, 5 and 6.

Referring to FIG. 1, a domestic electrical installation includes, for example, four electric storage heaters 1–4, which, again by way of example only, will be regarded as having a rating of 3kw each. These heaters are connected to a fuse and distribution box 5, and this box is connected by a cable 6 to a meter and timeswitch 7 which in turn is connected by a further cable to a main fuse 8 through which the remainder 9 of the installation is also supplied. The fuse 8 is connected by a cable 10 to a supply main 11. In a conventional installation the timeswitch 7 will switch on all four heaters 1–4 simultaneously, and since these will usually have fallen to a temperature low enough for their heating elements to be thermostatically switched on by integral thermostats in the heaters, the cable 6 will have to be rated to carry a 12kw load, the contacts of the timeswitch 7 must be similarly rated, and the fuse 8 and cable 10 must be rated 12kw over and above the load imposed by the remainder 9 of the installation. If many homes close by have the same forms of heating, an increase rating is also required for the supply main 11, and the sudden increase of load that occurs at certain times of day as all or most of the heaters are turned on simultaneously also causes problems in maintaining the supply voltage within statutory limits.

Assuming normal settings of the heater thermostats, the heaters individually usually require no more than a fraction of the total on period allowed by the timeswitch 7 to reach a temperature causing their thermostats to switch them off and thereafter need only short periods of power application to keep them "topped up" to desired temperatures set by the thermostats for the remainder of the on period. Thus a graph of consumption against time would show an initial period of 12 kw demand dropping off after a few hours to zero apart from occasional periods of probably not more than 3kw demand for "topping up" purposes.

It would obviously be desirable to average out this power demand so as to spread it more widely over the on period available while reducing the maximum demand. This can be done by incorporating in the distribution box 5 apparatus in accordance with the invention which is operative to supply power to each heater in turn for so long as its associated thermostat maintains it in circuit. By arranging that the programming of the apparatus is controlled in accordance with which heaters are switched off whether by their thermostats or otherwise, it can be ensured that an increasing proportion of the energy supplied is diverted to the remaining heaters as each heater is switched out of circuit, while the load on the supply remains constant.

FIG. 2 illustrates the application of the invention to an electric cooker having hotplates 21, 22, 23 and 24, two of these (for example) having a 2kw rating and the other two a 1 ½w rating. Each hotplate would normally be equipped with an independent control device such as a "Simmerstat" which would be operative to switch the hotplate it controls on and off, the mark-space ratio of this switching being adjustable according to the setting of the control to give different hotplate temperatures. It is clear that with such a system, it is possible for all the hotplates to be drawing current simultaneously, even though the setting of their controls is quite low, and the instantaneous demand on the supply may vary rapidly between 0 and 7kw in an erratic manner. However, if the independent controls are replaced by apparatus 25 in accordance with the invention operative to deliver current to each of the turned on hotplates in a continuous sequence of bursts responding to the condition of individual hotplate controls programming means in the apparatus 25 to control the total on period of each hotplate within this sequence then this problem can be overcome. The total power demand of the cooker cannot exceed that of the maximum rated hotplate, which reduces the flexibility of operation of the cooker slightly, but in many circumstances this disadvantage will be outweighed by the advantage of the arrangement in reducing peak power requirements, reducing fluctuations in power requirements, and in reducing the current rating necessary for the supply wiring 27. While the ratings of the hotplates differ, they are near enough the same to avoid violent fluctuations in the load on the supply.

FIG. 3 shows the invention applied to an industrial installation comprising for example four melting pots 30 having heating elements rated at 20 kw for each pot. In a conventional installation, the wiring of the installation must be rated on the basis that the heating elements of all four pots may be on simultaneously, corresponding to a peak demand of 80kw, whereas the average demand will be only a very small fraction of this figure.

The pots are each connected to a supply 35 through a control apparatus 33 in accordance with the invention, whose programming means respond to signals transmitted back along feedback loops 32 from thermostats 31 in the pots 30. The control apparatus 33 turns on and off in sequence those pots whose associated pot thermostats have closed contact indicating that the pots are below a desired temperature. Those pots whose thermostats have open contacts are excluded from the sequence.

Figure 4A:
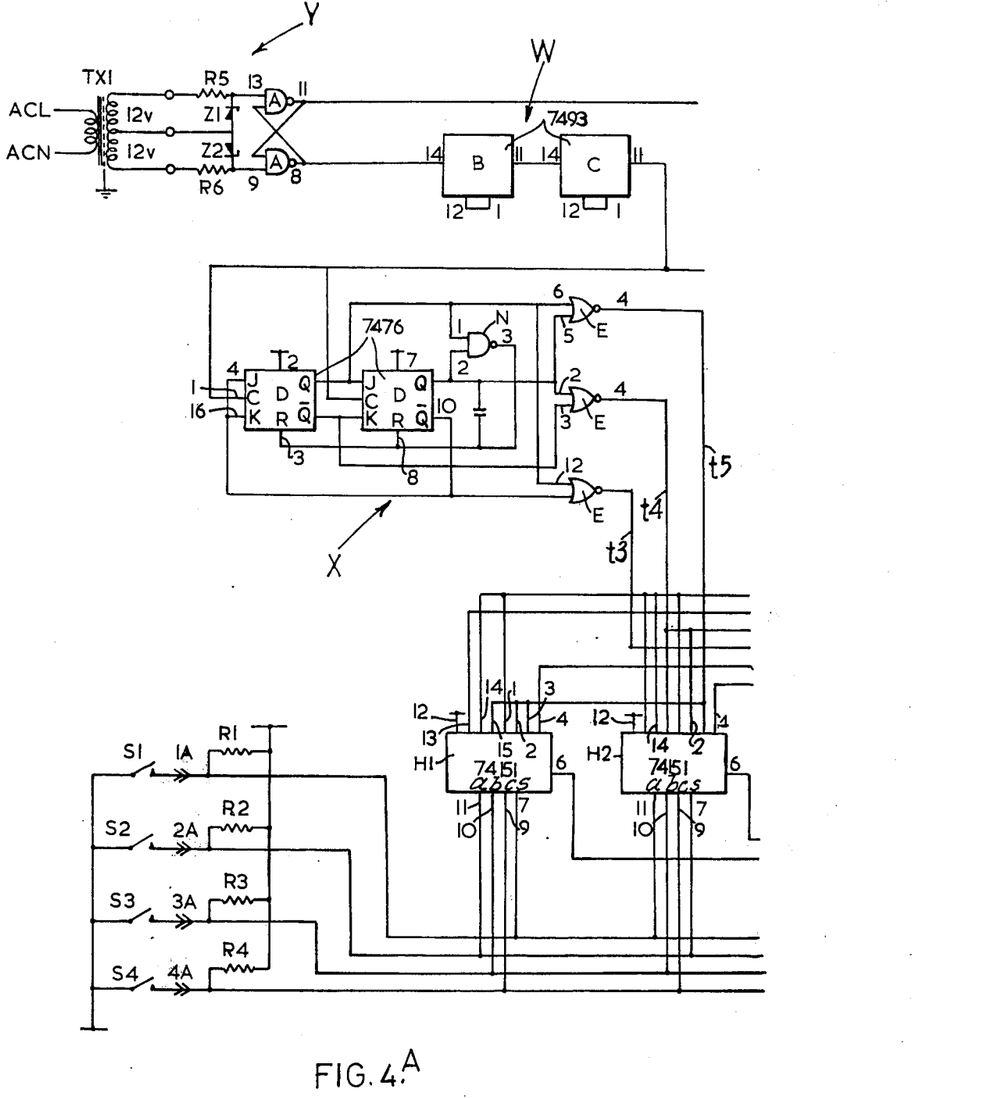
FIGS. 4A, 4B, 5, 6 and 7 are circuit diagrams of different embodiments of apparatus in accordance with the invention.
Figure 4B:
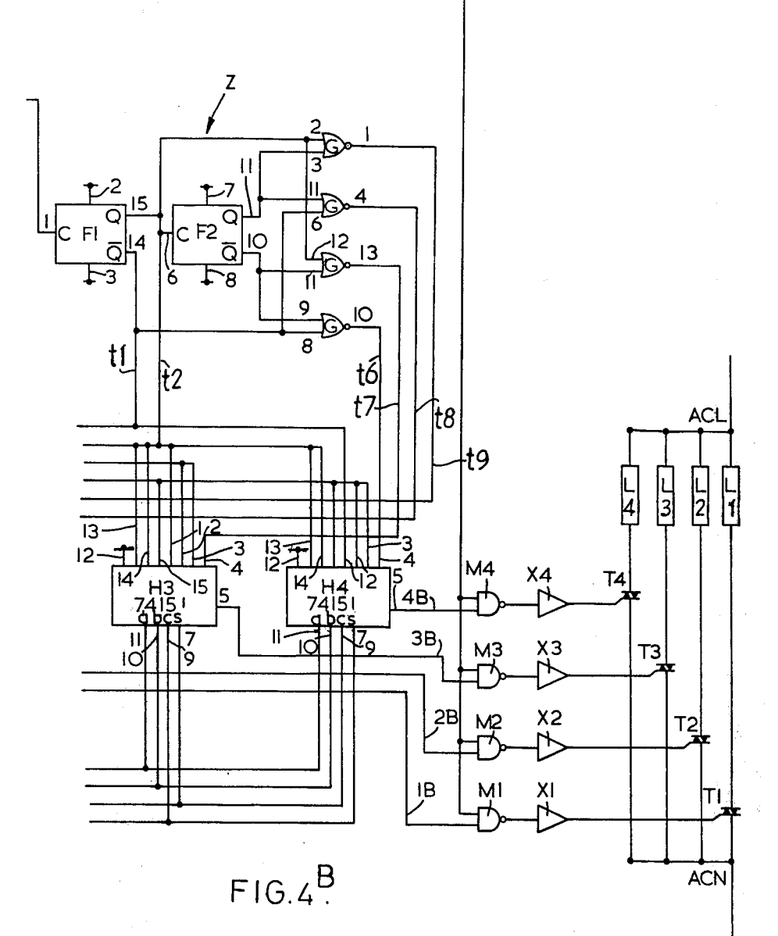

Referring now to FIGS. 4A and 4B, there is shown one embodiment of apparatus 33 (see FIG. 3) in accordance with the invention. Load units L1, L2, L3, L4 (for example the pots 30 in FIG. 3) are connected between the live and neutral lines ACL and ACN of an A.C. mains supply through triacs T1, T2, T3 and T4. As illustrated each load unit is associated with a manually controlled switch and/or thermostatically controlled contacts, represented by the switches S1, S2, S3 and S4. These switches act to make or break circuits independent of those containing the triacs and loads, although the switch arrangement shown in FIG. 3 may also be used as will be described below. The switches are connected across inputs 1A, 2A, 3A and 4A to programming means for sequencing means, the latter comprising data selectors H1, H2, H3 and H4 associated with the triacs T1, T2, T3, T4 respectively. The outputs 1B, 2B, 3B and 4B of the data selectors are utilized to strobe gates M1, M2, M3, M4 to each of which gates is applied a square wave at mains frequency produced by a pulse generator indicated generally by the reference numeral Y and comprising a flip-flop formed by cross-coupled gates A driven by clipped pulses derived from the mains supply by means of a transformer TX1, resistors R5 and R6 and zener diodes Z1 and Z2.

The outputs of the gates M1–M4 are applied to the gates of the triacs T1–T4 through pulse processing circuits X1–X4 which adjust the amplitude, source impedance and shape of the outputs of the gates to derive from each transition of the output of the pulse generator Y alternate positive and negative going pulses at the commencement of each half cycle of the alternating current mains supply suitable for firing the triacs. The inclusion of transformers or optical isolators in the circuits X1–X4 is essential if the remainder of the apparatus is to be electrically isolated from the circuits containing the triacs T1–T4, as will often be desirable for safety reasons.

In an alternative arrangement, the circuits X1–X4 are provided by zero voltage switches of the type which has become well known in integrated circuit form, a typical example being the CA3059 marketed by RCA. Since these integrated circuits comprise circuitry for producing appropriately timed and shaped pulses from an A.C. mains supply, the connection to the pulse generator may be omitted, as may the gates M, the output lines 1B, 2B, 3B, 4B being connected directly to a TTL compatible inhibit input on the zero voltage switch integrated circuit. In order to preserve correct polarities, the lines 1B, 2B, 3B and 4B should be connected to inverting outputs provided on the selectors H1–H4.

Thus it will be understood that the outputs of the data selectors are utilized to steer pulses from the generator Y to the triacs with which they are associated so as to complete the circuits to the associated loads L1–L4.

The data selectors are programmed by programming means in the form of the wiring connecting them to the switches S1–S4, which latter are connected to operate when closed so as to short to the ground rail of the power supply (not shown) of the sequencing means the lower end of associated pull-up resistors R1–R4 connected at their upper ends to the logic power supply positive rail, thus applying a logical 0 to those inputs on the selectors connected to any pull-up resistor so shorted. In the example being discussed, all these inputs are negative logic inputs. A strobe input s on each selector H1–H4 is connected to resistors R1, R2, R3, R4 respectively, thus ensuring that a data selector is only enabled when the switch associated with its associated circuit is closed. The switches S1–S4 are also connected in various combinations to programming inputs a, b and c on each of the selectors.

According to which input or combination of inputs a, b and c on a selector is or are brought to logical 0, so will the logical state of one of the eight inputs shown in the drawing as entering the top of each selector H1–H4 be applied to the associated gate M1–M4. Of these inputs, one on each selector is permanently pulled up, and the remainder are connected, in differing arrangements for each selector, to various of nine outputs $t1$–$t9$ of a pulse generating and timing circuit, comprising the counters generally indicated at X and Z which act to supply appropriate sequences of strobing pulses for selection by the selectors H1–H4 and thence for selective application to the gates M1–M4.

The pulse generating and timing circuit comprises firstly a divide by 3 counter X comprising two JK flip-flops D and a NAND gate N, together with output NOR gates E providing three sets of output pulses of 1:2 mark-space ratio, 120° out of phase relative to one another, to the lines $t3$, $t4$, $t5$. It further comprises a divide by four counter Z formed by a first JK flip-flop F1, supplying output pulses of 1:1 mark space ratio and in antiphase to the lines $t1$ and $t2$, as well as to a JK flip-flop F2 which in association with gates G provides four series of 1:3 mark-space ratio pulses to the lines $t6$–$t9$, each successive series being 90° out of phase with the preceding series. The generating and timing circuit is clocked by pulses derived from the output of the pulse generator Y, after passage through a clock generator W formed in the example by two cascaded divide by 16 counters B and C. However, the ratio of the divider is a matter of choice depending on the length of cycle desired for the pulse generator and timers X and Z, which depends in turn on the nature of the loads L1–L4. Where the loads are heating loads with a large thermal inertia, a long cycle length is perfectly acceptable, whereas loads of low inertia require a short cycle length if smooth operation is to be achieved. It is not strictly necessary that the clock pulses be derived by division of the mains frequency, and any suitable square wave generator will serve to generate clock pulses; however, it is desirable that the clock pulses be timed to begin and end in a defined relationship to the phase of the mains supply so as to help in avoiding spurious responses in the sequencing means.

The connections of lines $t1$–$t9$ to the data inputs of the selectors H1–H4 are so arranged in relation to the programming of the inputs a, b and c of the selectors in response to the condition of the switches S1–S4 that when only one switch is closed, the associated one of the gates M1–M4 is strobed continuously; when two switches are closed, the inputs from the lines $t1$ and $t2$ are applied to the associated two of the gates M1–M4 so that the gates are strobed alternately, each for half the time; when three switches are closed, the inputs from the lines $t3$, $t4$ and $t5$ are applied to the associated three of the gates M1–M4 so that the gates are strobed successively, each for one third of the time; and when all four switches are closed, the inputs from the lines $t6$ – $t9$ are applied to all four of the gates M1–M4 so that the gates are strobed successively, each for one quarter of the time. Appropriate selections of the loads L1–L4 associated with the gates M1–M4 are thus each energized in turn for appropriate periods, corresponding to an integral number of half cycles. Should the condition of one of the switches S1–S4 be altered, then the selectors H1–H4 will immediately be reprogrammed, and this programming will be effective to route the output from the pulse generator Y to the appropriate triac in accordance with the new program. Thus pulses marking the commencement of every half cycle of the mains supply will always be routed to one or other of the loads L1–L4.

The circuitry employed has not been described in detail. However, it is shown in the drawing as implemented utilizing standard 74 series TTL integrated circuits, the identity of the integrated circuits used being indicated in most cases in the drawings together with pin numbers appropriate to dual-in-line versions of these circuits. The gates A, N and M are provided by 7400 quadruple NAND gates and the gates E and G by 7402 quadruple NOR gates. It will be apparent to those skilled in the appropriate arts how the circuit can be expanded to handle a larger number of loads, or to utilize alternative families of logic, or revised for embodiment in a purpose designed integrated circuit.

It may be desirable or, when modifying existing installations, more convenient to place the switches S1–S4 in series with the loads as shown in FIG. 3. In this case, means must be provided to sense whether the circuit including any particular triac is unbroken and to respond thereto by applying appropriate logical signals to the input lines 1A, 2A, 3A, 4A. However, since contact arcing usually results in mechanical switching off of a load carrying circuit being ineffective until the end of a half cycle, switching of a load while it is energized may be responded to too late for the control logic to be reprogrammed in time to direct the next firing pulse to a different triac. Hence the previously described arrangement with the switches S1–S4 in separate circuits directly controlling the programming means is preferred.

Figure 5:
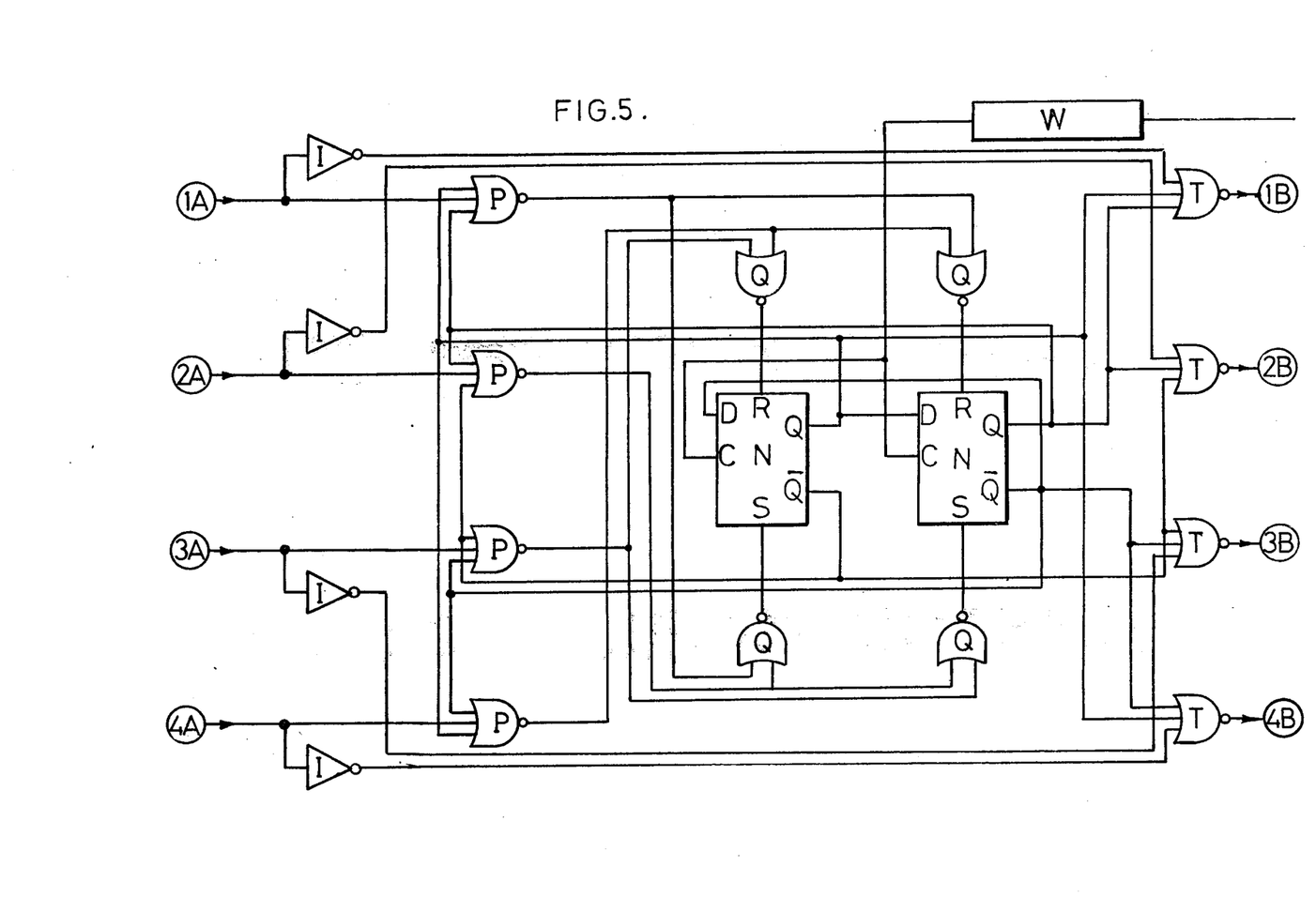
Figure 6:
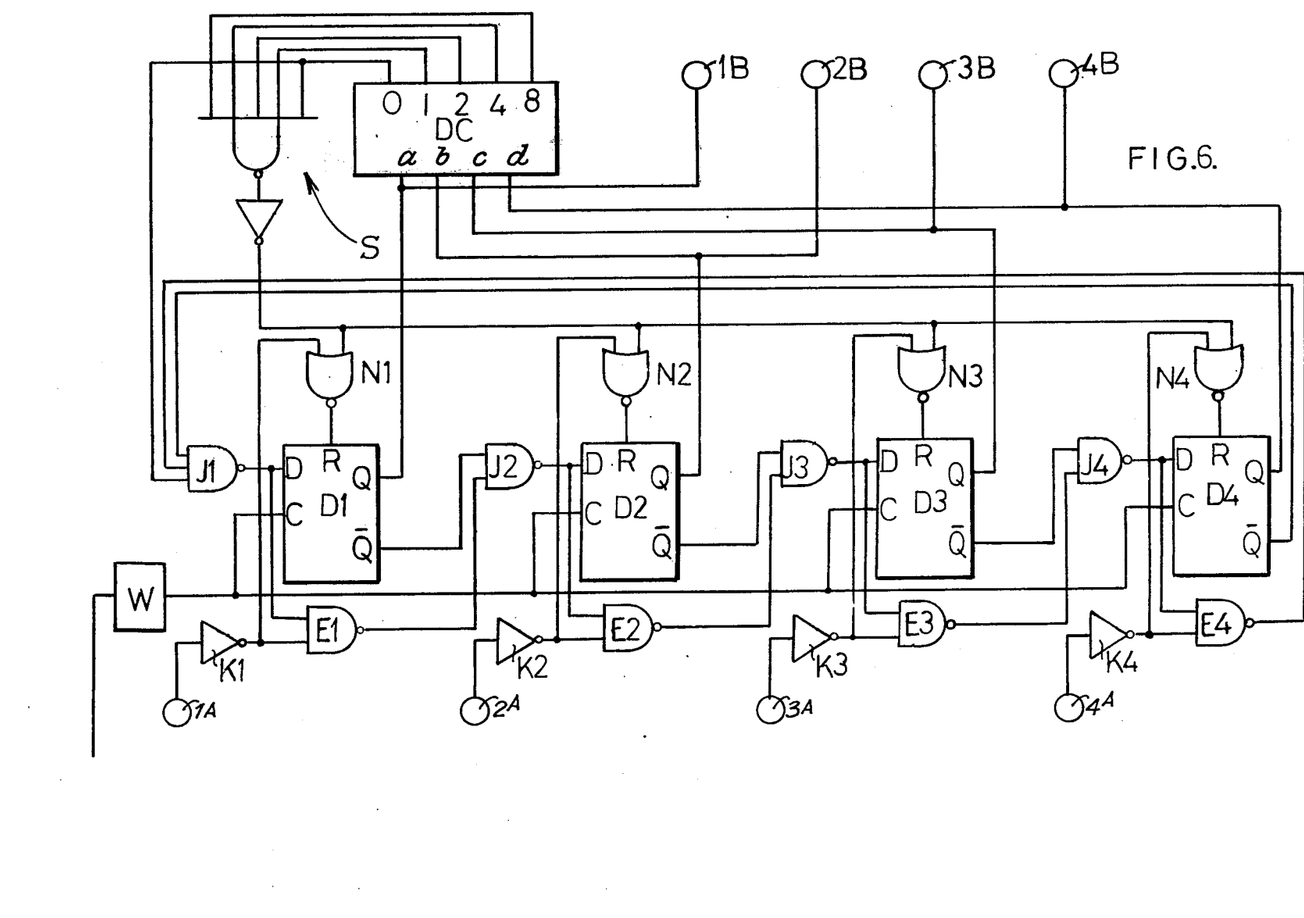

FIGS. 5 and 6 show two alternative embodiments of apparatus 33 (see FIG. 3), the circuit controlled by the output lines 1B–4B being omitted since it is similar and subject to similar modifications to that of FIGS. 4A and 4B.

In FIG. 5, pulses from a clock generator W similar to the generator W in FIG. 4 are used to clock sequencing means comprising a two stage Mobius counter comprising two appropriately connected D type flip-flops N having preset and clear inputs S and R respectively which are utilized for setting the counter to any desired stage in its counting cycle in response to the detection of a particular stage in the counting cycle by a programming means comprising a system of NOR gates P and Q, which system is programmable both as to the count stage detected (by means of the gates P) and the count stage set by means of the S and R inputs in response to detection of the former stage (by means of the gates Q). This programming is in accordance with the logic level applied to the inputs 1A, 2A, 3A, 4A in response to the condition of the switches S1, S2, S3, S4 (see above). In the sequencing means the Q and $\bar{Q}$ outputs of the counter stages are decoded by further NOR gates T and applied to the outputs 1B, 2B, 3B, 3*b*, which control circuitry steering pulses to the triacs T1, T2, T3 and T4 as in the previous embodiment. The decoding gates T are strobed by the input lines through inverters I so as to avoid the possibility of spurious pulses appearing on an output line when its associated switch S1–S4 is open.

As will be apparent from study of the circuit, the sequencing means is such that the counter can only remain in counting stages producing logical 1 outputs on output lines corresponding to input lines carrying a logical 0 input (i.e. inputs associated with a switch S1–S4 which is closed). Hence the counter, as it is clocked, will cause trains of gating pulses to be directed successively to those of the triacs T1–T4 which are associated with those of the switches S1–S4 which are closed.

FIG. 6 shows an alternative arrangement in which the clock pulse generator W is used to clock sequencing means comprising a ring counter using four D-type flip-flops D1, D2, D3 and D4, one for each load to be controlled, connected to form a shift register. The output lines 1B, 2B, 3B, 4B are connected to the Q outputs of the flip-flops D1–D4, and the register is clocked by pulses from the clock pulse generator W, which is similar to the generators W previously described. Thus as a single bit is entered into the register and caused to circulate by the clock pulses, each output line will be brought in turn to the high state thus steering a train of firing pulses to its associated triac T1–T4. However, the input lines 1A, 2A, 3A, 4A are used to control programming means comprising a system of gates which programs the ring counter so as to cause the count to step past those flip-flops D1–D4 associated with input lines 1A–4A whose associated switches S1, S2, S3 and S4 are open. Thus the flip-flops are connected into the register by connecting the $\bar{Q}$ output of one flip-flop to the D input of the next flip-flop through NAND gates J1–J4, while the programming inputs are applied through inverters K1–K4 and are thus used when they go low to strobe NAND gates E1–E4 which each apply the D input of one of the flip-flops D1–D4 to the gate J1–J4 of the following flip-flop. The associated inverted input 1A–4A is also applied via a NOR gate N1–N4 to reset input R of the flip-flop to be bypassed so that the associated output 1B–4B remains at the 0 logic level.

Provision must be made to start the register by introducing a single binary digit, and to prevent it from operating in false modes. For this purpose the Q outputs of the flip-flops D1–D4 are applied to a decoder shown generally at S, which decoder is first effective to detect a condition of the ring counter in which all Q outputs are low, to which it responds by applying a digit to the flip-flop D1 through an additional input on the gate J1. The decoder also detects a state in which more than one of the Q outputs is high, to which it responds by resetting all the flip-flops. The decoder comprises a BCD to decimal decoder DC, of which the 0, 1, 2, 4 and 8 outputs are connected to a NAND gate and then through an inverter to the NOR gates N1–N4. The 0 output is also connected to the gate J1. The presence of a 0 output from the decoder corresponds to a state of the counter in which all the Q outputs are low, and the absence of a 0, 1, 2, 4 or 8 output corresponds to a state of the counter in which more than one of the Q outputs is high.

It will be appreciated that this embodiment is very readily expanded to provide apparatus for controlling any desired number of loads.

It will also be appreciated that the embodiments described above are by way of example only. Sequencing means may be utilized which permit groups of loads to be energized simultaneously, provided that the groups are always of similar total consumption. Likewise, provision may be made for the periods for which different loads are energized to be varied relative to one another, or for selected loads to be energized more than once in a single switching cycle. One way in which this may readily be achieved is by utilizing any of the embodiments previously described, but paralleling a pair of inputs and outputs to serve a single load.

Figure 7:
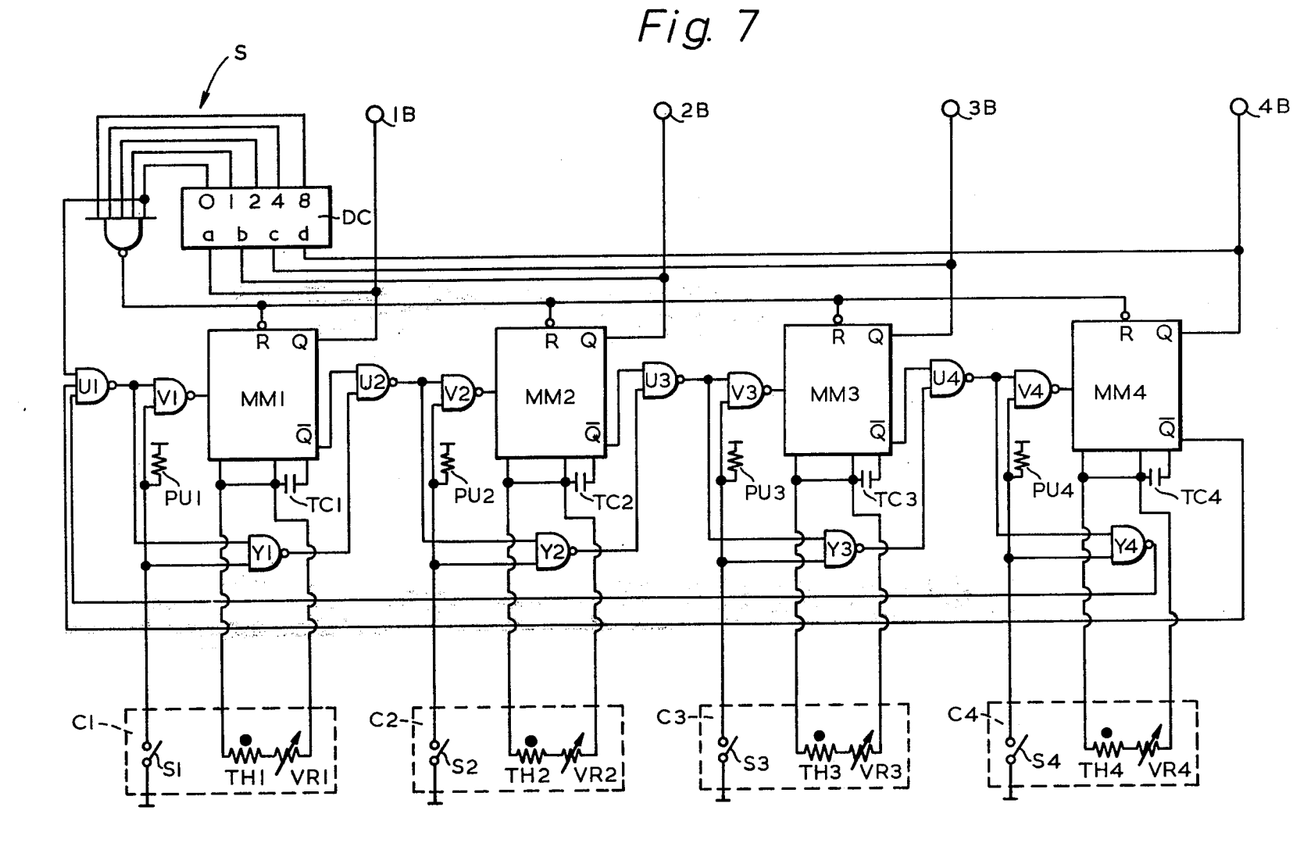

An alternative method of varying the relative periods for which different loads are energized is illustrated in FIG. 7, the circuit of which can be used to replace that of FIG. 6 except that control means C1, C2, C3, C4 associated with the consuming units are shown, and comprise, in addition to the switches S1, S2, S3 and S4, variable timing elements in the form of thermistors TH1, TH2, TH3 and TH4 connected in series with variable resistors VR1, VR2, VR3 and VR4. The sequencing means in this embodiment again comprises a form of ring counter, but in this case the ring is formed of monostable multivibrators MM1, MM2, MM3 and MM4, and is self-clocking at a rate dependent on the reset time of the multivibrators, which in turn is dependent upon the values of timing capacitors TC1, TC2, TC3 and TC4, and of timing resistances formed by the combined resistances of the thermistor and variable resistance comprises by each control means. The output lines 1B, 2B, 3B and 4B are connected to the Q outputs of the monostables MM1 – MM4. Thus assuming that the monostables are all initially in their stable condition, and the monostable MM1 is triggered by all the inputs to an associated input gate VI (forming part of programming means described further below) going high, this monostable will remain set for a period determined by the values of TC1, TH1 and VR1 before resetting itself to its stable conditions. During this period, the output line 1B will be brought to a high state thus routing firing pulses to the triac T1 (see FIG. 4), while the other output lines remain low. As the monostable MM1 rests, its $\overline{Q}$ output goes high and, assuming that the intervening gates forming part of the programming means are appropriately conditioned, results in triggering of the monostable MM2, thus causing firing pulses to be routed to the triac T2, instead of triac T1, for a period determined by the values of TC2, TH2 and VR2. This process is repeated indefinitely, with the pulses being routed to each triac in turn for periods which, assuming the timing capacitors TC1 – TC4 are fixed, are determined by the resistance of the thermistors TH1 – TH4, and the setting of the variable resistors VR1 – VR4.

The connections between the variable resistors and thermistors and the monostables thus program the sequencing means so as to determine the relative periods for which the various output lines go high. Assuming that the loads being controlled are heating elements, and that the thermistors have a negative temperature coefficient and are in contact with whatever is to be heated by the elements, the on periods of a triac associated with a particular load will change as the temperature of the load changes. A decrease in the temperature sensed by any one thermistor will result in the on periods of the associated triac being increased, while an increase in the temperature will result in the on periods being reduced. Thus the relative time for which power is supplied to the various loads is automatically varied according to their relative temperatures. The variable resistors VR1 – VR4 may be utilized to compensate for variations in thermistor characteristics and to provide a desired temperature response characteristic; additionally, they, or additional variable resistors connected in series or parallel may be utilized to provide a temperature control for the load concerned.

Additional control means for each load will normally be required in the form of the individual switches S1–S4 for each load, which may be thermostatically or manually controlled. The connections between these switches and the monostables MM1 – MM4, and the gate included in these connections, complete the means for programming the sequencing means. Broadly, the function of this part of the programming means is to ensure that operation of the sequencing means is such that any monostable MM1–MMr associated with an open switch S1–S4 is stepped past without its associated output line enabling firing pulses to be directed to the associated triac, the following monostable associated with a closed switch being triggered instead. Clearly, if all the switches are open, no monostable should be triggered and no load should be energized, while with only one switch closed, the associated monostable should be continuously retriggered. Since in this instance no recovery period can be allowed before retriggering, retriggerable monostables should be used, such as the Texas Instruments SN 74123 integrated circuit.

In order to achieve this, the monostables are formed into the ring counter by means of gates U1, U2, U3 and U4 admitting inputs to the monostables and gates Y1, Y2, Y3 and Y4 bypassing their associated monostables, the admission gate or the bypass gate associated with each monostable being alternatively enabled according to the condition of the associated switches S1 – S4, which when open allow pull-up resistors PU1, PU2, PU3 and PU4 to become operative, and when closed operate as pull downs.

Provision must be made to start the counter, and to prevent it operating in unwanted modes, for example with more than one monostable fired simultaneously. For this purpose, the Q outputs of the monostables MM1 – MM4 are applied to a decoder shown generally at S, which decoder is firstly effective to detect a condition of the ring counter in which all the Q outputs are low, to which it responds by triggering the monostable MM1 (or the first following monostable whose admission gate is enabled if the gate V1 is disabled by the switch S1) through an additional input on the gate U1. The decoder also detects a state in which more than one of the Q outputs is high, to which it responds by resetting all the monostables. The decoder comprises a BCD to decimal decoder DC, of which the 0, 1, 2, 4 and 8 outputs are connected to a NAND gate and then to reset inputs R on the monostables. The presence of a 0 output from the decoder corresponds to a condition in which all the Q outputs are low, and the absence of a 0, 1, 2, 4 or 8 output corresponds to a state in which more than one of the Q outputs is high.

As in the embodiment of FIG. 6, this embodiment is very readily expanded to provide apparatus for controlling any desired number of loads.

Figure 8:
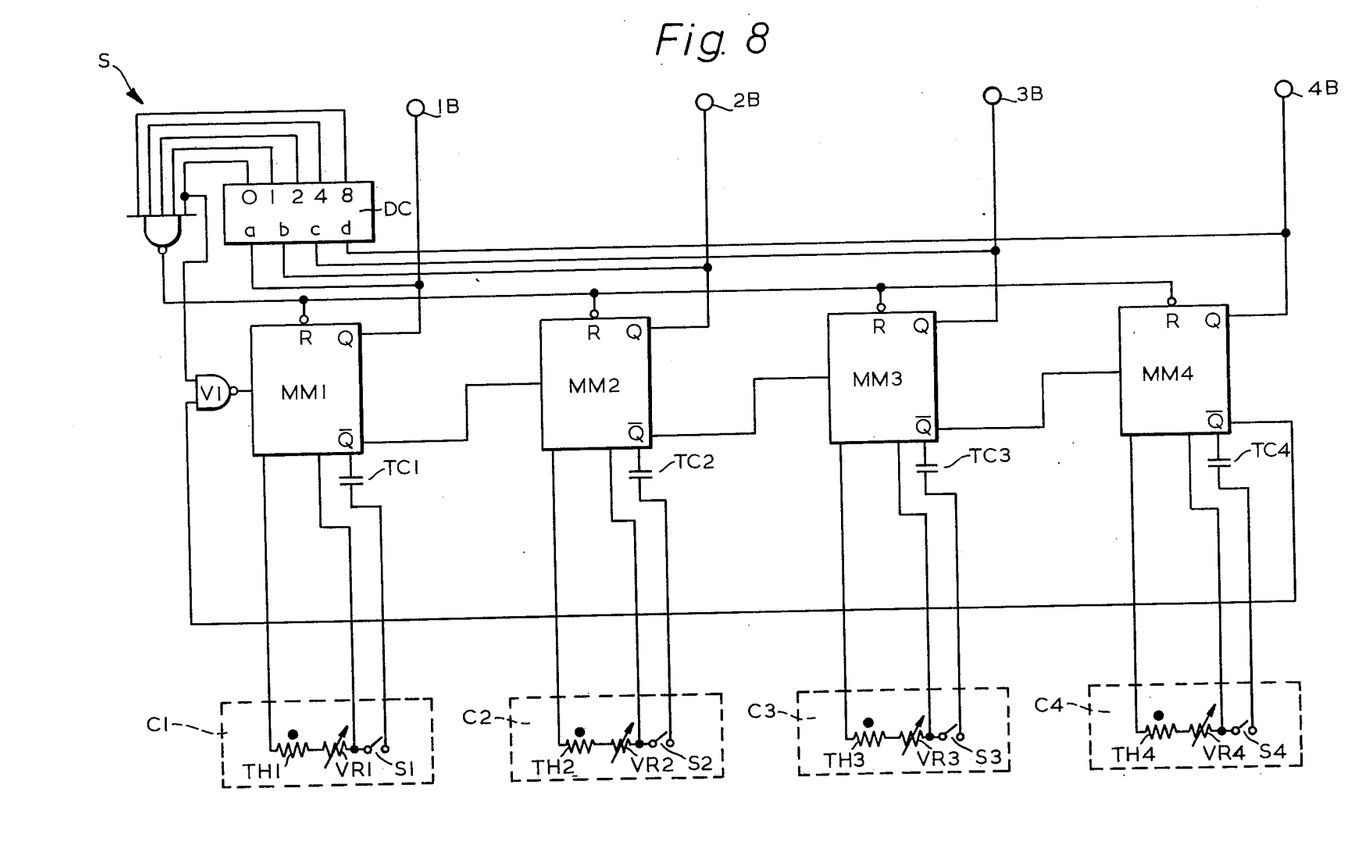
FIG. 8 is a circuit diagram illustrating a further modified form of the invention.

FIG. 8 represents a variant of the embodiment of FIG. 7, similar reference numerals being used for like parts, in which the programming means have been further simplified. In this embodiment the switches S1 – S4 are placed in series with the timing capacitors TC1 – TC4, the effect of opening a switch being to reduce the timing capacitance and therefore the on time of the associated monostable almost to zero, with the result that, using high speed integrated circuit monostables, the triggered monostable resets before it can direct firing pulses to its associated triac, and the following monostable is triggered instead. Thus instead of the connections to the switches programming the sequencing means to bypass monostables associated with an open switch, such a monostable is triggered and immediately reset before it can have any effect on the routing of firing pulses to the triacs. This mode of operation enables the gates U1 – U4, V2 – V4 and Y1 – Y4 to be dispensed with, the gate V1 being retained to accept signals from the decoder. However, it may not be suitable for use where the switches S1 – S4 must be remote from their associated monostables, due to lead capacitance decreasing the rate at which a monostable can reset when its associated switch is open.

What is claimed is:

1. Apparatus for distributing power from a single alternating current source to a plurality of consuming units each having individual control means associated therewith, comprising gate triggered current maintained devices adapted to be placed in series with each of the consuming units, means repeatedly to trigger on said devices substantially at the zero crossing points of the alternating current supply, sequencing means operative to control said trigger means so as to trigger on different, or different combinations, of the devices for immediately successive non-overlapping bursts of integral numbers of half cycles of the supply in accordance with a continuously reprogrammable sequence, and programming means adapted to respond to the condition of individual control means associated with the consuming units and to reprogram the sequencing means in accordance with changes in the condition of said individual control means, the sequencing means comprising means to derive a plurality of different pulse trains from a clock pulse train from a clocking means, selector means programmable by the programming means to select different combinations of the different pulse trains, and gating means operable by said combined pulse trains to condition the triggering means to trigger on different ones of the gate triggered devices.

2. Apparatus for distributing power from a single alternating current source to a plurality of consuming units each having individual control means associated therewith, comprising gate triggered current maintained devices adapted to be placed in series with each of the consuming units, means repeatedly to trigger on said devices substantially at the zero crossing points of the alternating current supply, sequencing means operative to control said trigger means so as to trigger on different, or different combinations, of the devices for immediately successive non-overlapping bursts of integral numbers of half cycles of the supply in accordance with a continuously reprogrammable sequence, and programming means adapted to respond to the condition of individual control means associated with the consuming units and to reprogram the sequencing means in accordance with changes in the condition of said individual control means, the sequencing means comprising a programmable counter, and gating means operable by the counter in accordance with the stage of its count to permit the triggering means to trigger on different ones of the gate-triggered devices, the counter being programmable by the programming means to count past counting stages associated with the triggering of particular devices in accordance with the condition of the control means associated with the loads controlled by those devices.

3. Apparatus according to claim 2, wherein the counter is a ring counter.

4. Apparatus according to claim 2, wherein the counter is a Mobius counter.

5. In electrical power distribution apparatus for sharing power between loads having respective independent power controls, said loads being connected in series with respective thyristors each having control electrodes to control the conductive and non-conductive states thereof, said power being derived from a single AC source and shared by said apparatus between said loads so as to avoid exceeding a predetermined maximum power demand, the apparatus including means for generating a continuous series of pulses timed substantially to coincide with the zero crossing points of the AC supply for controlling said thyristors, the improvement comprising programming means, said programming means including gating means responsive to the state of said independent power controls of said loads to derive respective signals, and pulse steering means connected to receive said respective signals and said continuous series of pulses to steer pulses in a cyclic manner to said control electrodes of any combination of said thyristors according to a power sharing program, said program depending on the state of said independent power controls and on said maximum power demand, whereby said different thyristor combinations sequentially provide said respective loads with an integral number of half waves of said AC power according to their individual demands.

6. Power distribution apparatus for sharing power between a plurality of loads having respective independent power controls, such as a thermostat or switch, the position of which represents the demand of the load in question, the loads being connected in series with respective thyristors to a single AC power source, the apparatus comprising means for generating a continuous series of pulses timed substantially to coincide with the zero crossing points of said AC source, pulse steering means responsive to said continuous series of pulses for supplying respective pulsed outputs to gates connected to the control electrodes of said thyristors to cause said loads to be supplied with power from said AC source, said gates having inputs connected to the respective outputs of said pulse steering means and having inputs connected to said independent power controls, said independent power controls being connected to respective inputs of said pulse steering means which is thereby operative to steer successive pulses, during a predetermined cycle to the gates which are connected to the loads demanding power from said source so that the total power supplied to said loads is shared equally, during each cycle, without exceeding a predetermined power demand.

7. Apparatus according to claim 6 wherein said pulse steering means comprises respective data selectors for each of said loads, the inputs of the data selectors being connected to pulse counting circuits which are connected to a frequency divider.

8. Apparatus according to claim 6 wherein said pulse steering means comprises a two stage Johnson counter, having inputs connected through gates to said independent power controls.

9. Apparatus according to claim 6 wherein said pulse steering means comprises a ring counter having a plurality of stages the input to any one stage being derived from the output of a gate connected to the successive stage and to the respective one of said independent power controls.

* * * * *